Figures 1, 2, 3:
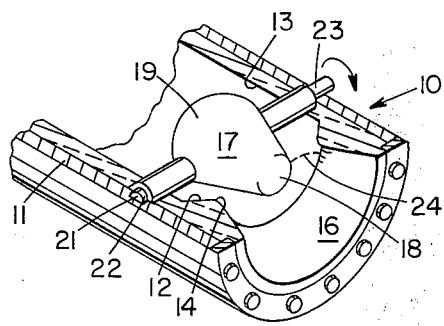

United States Patent [19]
McComas

[11] 3,907,222
[45] Sept. 23, 1975

[54] VARIABLE THRUST ROCKET MOTOR NOZZLE ASSEMBLY, AND ROCKET ASSEMBLY CONTAINING SAME

[75] Inventor: Tommy Darrel McComas, La Vale, Md.

[73] Assignee: Hercules Incorporated, Wilmington, Del.

[22] Filed: Sept. 14, 1973

[21] Appl. No.: 397,483

[52] U.S. Cl. .................... 244/74; 60/230; 60/271; 239/265.19
[51] Int. Cl. ............................................ B64c 15/08
[58] Field of Search .......... 244/52, 74; 60/230, 242, 60/228, 271; 239/265.19, 265.33, 265.25; 138/45

[56] References Cited
UNITED STATES PATENTS

| | | | |
|---|---|---|---|
| 3,096,049 | 7/1963 | Karasinski | 60/230 |
| 3,130,544 | 4/1964 | Penza | 60/271 |
| 3,188,024 | 6/1965 | Schneider | 244/74 |
| 3,192,714 | 7/1965 | Hickerson | 60/230 |
| 3,743,184 | 7/1973 | Mancus | 60/230 |

Primary Examiner—Trygve M. Blix
Assistant Examiner—Galen L. Barefoot
Attorney, Agent, or Firm—S. Grant Stewart

[57] ABSTRACT

A convergent-divergent rocket motor nozzle; and, in one embodiment, a solid rocket propellant motor assembly containing same as a component. The nozzle assembly includes a thrust control element rotatable on an axis which is transverse to the nozzle axis and upstream from the throat section. The thrust control member is dimensioned so as to be rotatable about the transverse axis into and from formation of an annulus with the inner wall of the convergent section, with the annulus having a minimum cross-sectional area less than that of the throat section to thereby function as an effective (smaller) throat dimension providing for corresponding increase in thrust. When the thrust control element is rotatably out of the annulus forming position, the throat section is operable at its normal (larger) throat dimension to provide for a corresponding decrease in thrust. Means external to the nozzle assembly in direct operative communication with the control element provides for the requisite degree of rotation of the element on the transverse axis.

7 Claims, 6 Drawing Figures

VARIABLE THRUST ROCKET MOTOR NOZZLE ASSEMBLY, AND ROCKET ASSEMBLY CONTAINING SAME

This invention relates to a variable area rocket motor nozzle assembly for controlling thrust of a propellant rocket motor. In one aspect this invention relates to a rocket assembly including a solid rocket propellant motor in combination with a variable area nozzle assembly described above. Other aspects will be apparent in light of the accompanying disclosure and the appended claims.

Various systems have been proposed for regulating nozzle throat area for control of magnitude and thrust of rocket propellant motors. However, the complexity of such systems and the space and weight requirements involved have in many instances presented serious economic and operational problems.

This invention is concerned with a variable thrust rocket motor nozzle system of simplified design providing for improved missile capabilities, and operation, and with rocket assemblies containing same. The rocket nozzle assembly provides for different values of effective throat area within a single flight of the rocket, and hence for varying the magnitude and direction of rocket motor thrust during a single mission.

In accordance with the invention, a convergent-divergent rocket motor nozzle assembly including coaxially disposed convergent, divergent and intermediate throat sections is provided which comprises:

an imperforate thrust control element facing said throat and rotatable on a transverse axis upstream from said throat and substantially normal to the throat axis;

an end section of said control element opposing said transverse axis and dimensioned for emplacement within said convergent section to form an annulus with the inner wall of said convergent section having a minimum cross-sectional area less than the minimum cross-sectional area of said throat;

said transverse axis spaced from said throat and from the end of said end section for rotation of said element thereon to rotatably move said end section into and from position in said convergent section to form or eliminate said annulus;

and means for rotating said element on said transverse axis to move said element end section into and from said position for forming said annulus, whereby said element can be rotated about said transverse axis to provide a variable throat area for control of thrust of a propellant motor when disposed in propulsion relationship with said nozzle assembly.

The control element can be of any suitable shape and size so long as the end section to be rotatably emplaced in the convergent section is suitably dimensioned for the requisite annulus formation. Although the control element is advantageously a frusto-cone having spherical end surfaces of different radii, the control element can be for example elliptical, spherical, cylindrical, rectangular and the like.

The control element, in preferred practice, is rigidly supported on a rotatable shaft journaled at each end in the nozzle casing wall, the shaft in turn forming the requisite transverse axis for rotation of the control element into and from emplacement for annulus formation in the convergent nozzle section. In preferred practice, the rotatable shaft extends, at one end, through the nozzle casing wall into operative communication with external drive means for the shaft rotation.

Any suitable means can be utilized for rotation of the control element on the transverse axis. Now preferred is a linear hydraulic actuator controlled by an attached servovalve externally secured to the nozzle casing and geared through a rack and wheel assembly with the element support shaft for rotation of the latter to accomplish the control element emplacement.

For preferred operation of the nozzle assembly to impart high thrust, the emplaced control element end section is uniformly dimensioned about its periphery so that the minimum cross-section of the annulus is uniform to thereby provide for requisite control of flight direction of the missile. Under these conditions, the minimum cross-sectional area of the annulus is less than that of the throat and hence the annulus operates as the effective throat area, i.e., as the "small throat area."

By rotation of the control element 180° from its small throat area position, it is moved from its annulus forming position within the convergent section to thus eliminate the small area annulus structure, and the intermediate nozzle throat section then serves its function as the "large throat area" with accompanying reduction in thrust.

In the event that the control element also includes an additional opposing end section, that adjacent end section is dimensioned so that upon rotation of the control element 180° it (the adjacent end section) remains outside the convergent section or, alternatively, it coaxially moves into the convergent section insufficiently to form a small throat area type annulus with the inner wall of the convergent section.

The control element, particularly at the large throat area position requires only a small amount of actuation force for its rotation to the small throat area position. At the large throat area position, the unbalanced pressure forces tend to force the element to rotate 180° to the smaller throat area position. Thus, in lieu of a positively controlled rotation device, such as a servovalve system above referred to, the control element can be latched to the large throat area position, and unlatched to allow it to be moved by the unbalanced forces to the small throat area position. However, for continued cyclic rotation, or when particularly rapid actuation is required, a positively directed actuation mechanism such as a servovalve system illustrated herein, or a conventional coiled power spring such as used in time clocks with a latch/unlatch device, will be required.

Figure 4:
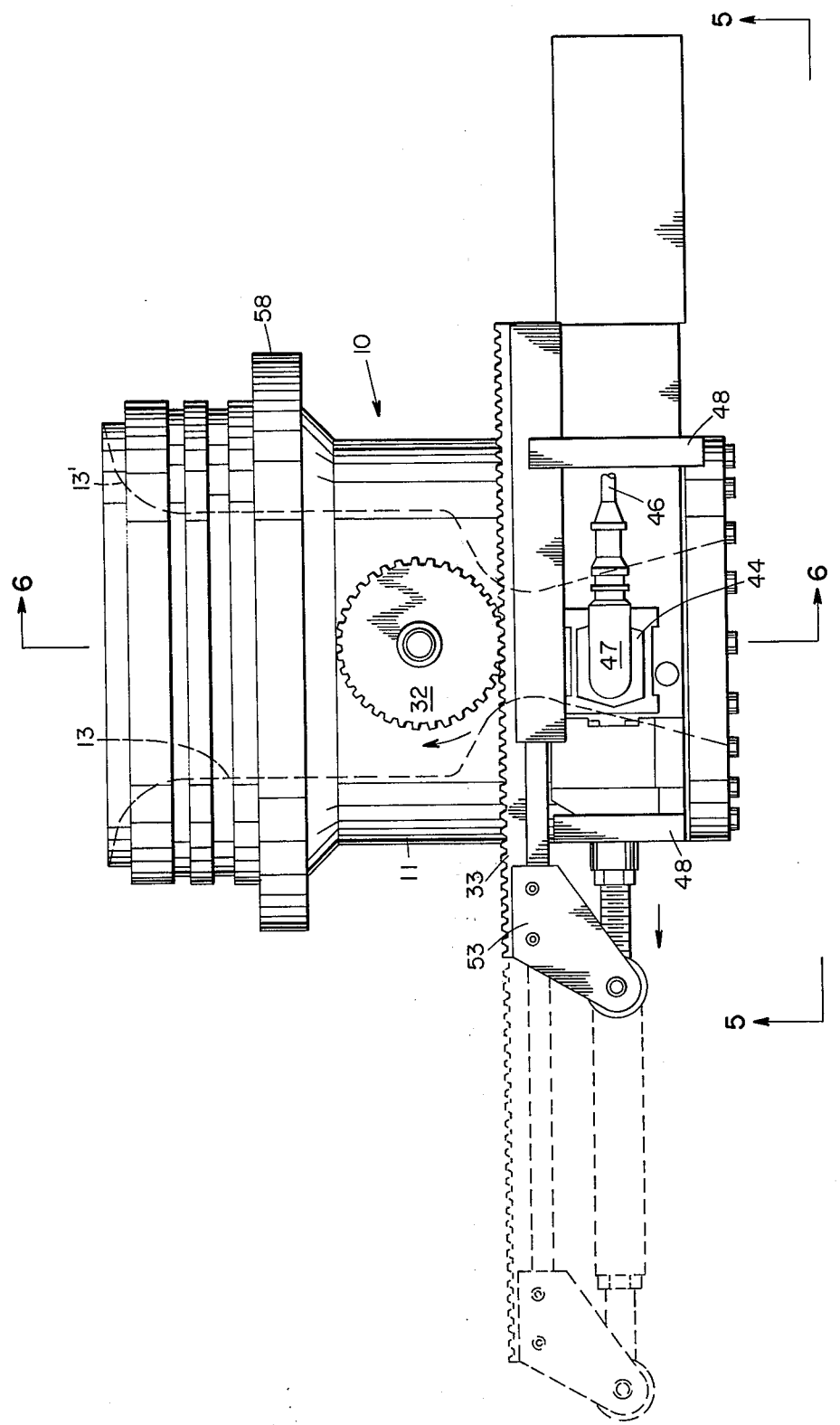
Figure 5:
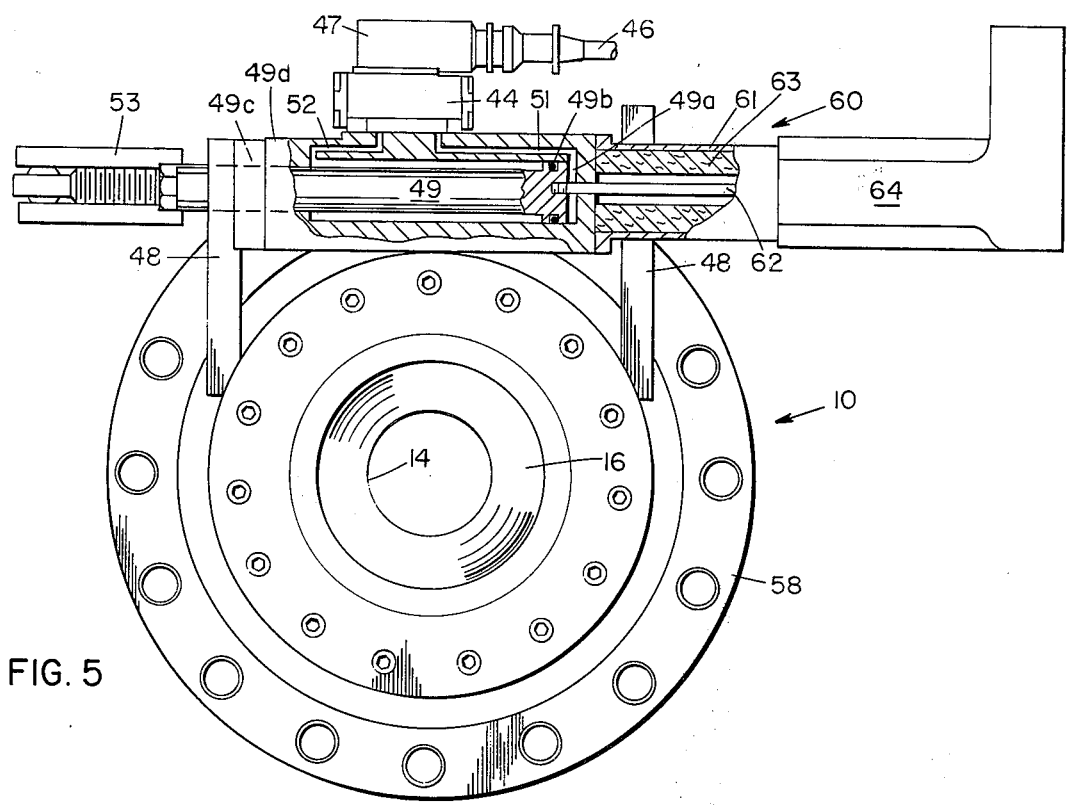
Figure 6:
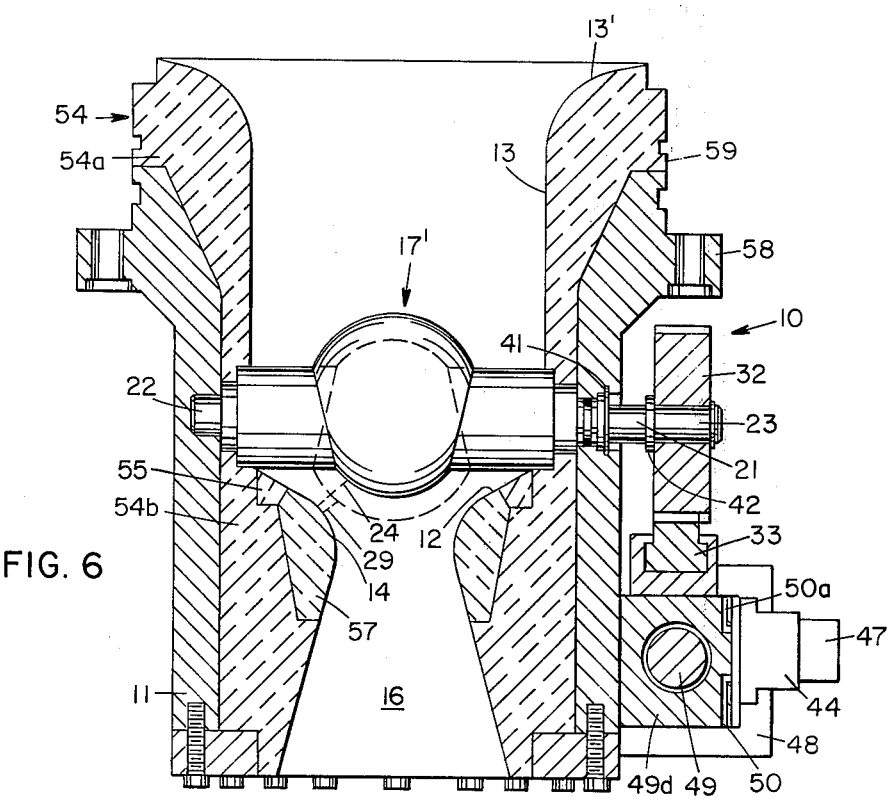

The invention is further illustrated with reference to the drawings of which FIG. 1 basically illustrates the dual area nozzle assembly of the invention; FIG. 2 illustrates a rocket assembly of the invention including a solid rocket propellant motor and a nozzle assembly such as is illustrated with reference to FIG. 1, together with external means for rotation of the control element; FIG. 3 illustrates in detail a now preferred embodiment of the rotatable control element of the above-described nozzle assembly including a support shaft as a transverse axis for the rotation; FIG. 4 is a view of a nozzle assembly of the invention further illustrative of rack and wheel gear means of FIG. 2 together with linear servovalve type drive means therefor; FIG. 5 is a view of along the line 5—5 of FIG. 4 further illustrative of the servovalve assembly and associated gear means of FIG. 4; and FIG. 6 is a view along the lines 6—6 of FIG.

4 further illustrative of the nozzle assembly in the structure of FIG. 4. In FIGS. 1–6, all like parts are designated by like numbers.

Referring to FIG. 1, convergent-divergent nozzle 10, within nozzle casing 11 comprises convergent gas inlet section 12 connecting at its upstream end with gas inlet end 13 and at its downstream end through intermediate throat section 14 into divergent end section 16. Nozzle sections 12, 14 and 16 are disposed coaxially.

Imperforate frusto-conical thrust control element 17 is disposed centrally upstream from, and facing, cylindrical throat section 14 and is rotatably supported in gas inlet end 13 on transverse shaft 21 which is substantially perpendicular to the axis of convergent section 12 and is journaled at each of its ends 22 and 23 within the wall of nozzle casing 11 with its end 23 extending through casing wall 11 into operative communication with an actuation system for rotation of element 17 described more fully hereinafter.

Opposite ends 18 and 19 of control element 17 are spherical and have different radii as measured from the intersection of the longitudinal axes of shaft 21, and convergent section 12. Spherical end 19, having the longer radius constitutes that end section of control element 17 rotatably movable into convergent section 12 to form the small throat area by the formation of the annulus 29 (FIG. 2) of minimum cross-sectional area less than the minimum cross-sectional area of throat 14. As shown in FIG. 1, control element 17 is rotated into coaxial position with convergent section 12 with end section 19 180° away from the small throat area forming position. Spherical end 18 shown in rotated position in convergent section 12 forms an annulus 24 having a minimum cross-sectional area greater than the minimum cross-sectional area of throat 14, hence to permit throat 14 to function as the large throat area.

Conical member 17 advantageously extends from spherical end 19 beyond shaft 21 to the spherical end 18 to facilitate balance of element 17 on shaft 21 for the required mechanical rotation. However it is not required that control element 17 extend from spherical end 19 beyond shaft 21, inasmuch as throat area in practice of the invention is varied from the large throat area which is that of throat 14 to the smaller throat area determined only by the position of spherical end member 19 in section 12.

Shaft 21 is perpendicular to the axis of convergent section 12 and is spaced from throat 14 and from spherical end 19 for accomplishing the requisite rotation of element 17 into its predetermined position in convergent section 12; and spherical end 19 is dimensioned with reference to convergent section 12 to be so positioned in converging section 12 to form the required annulus 29 (see FIG. 2). Generally shaft 21 is positioned upstream from convergent section 12, although dependent upon the axial length of convergent section 12, shaft 21 can be supported in section 12.

Referring to FIG. 2, nozzle assembly 10 of FIG. 1 is shown in more detailed cross-section with upstream outwardly flanged gas inlet end 13' connecting with flange coupler 58 of propellant motor casing 27 in coaxial relationship therewith, and loaded with solid propellant 28, including ignition means not shown.

Shaft 21 is shown in FIG. 2 rotated 180° from its position of FIG. 1 to emplace spherical end section 19 within convergent end section 12 to form the requisite annulus 29 with the inner wall of convergent section 12, the annulus 29 having a minimum cross-sectional area less than the minimum cross-sectional area of throat 14 to thereby provide the small area throat defined by annulus 29.

Shaft 21 at its end 23 extends through nozzle casing wall 11 to connect with the axis of external gear wheel 32 the latter in a plane normal to shaft 21. Upright rack gear 33, supported as described hereinafter, is meshed with gear wheel 32 so as to cause rotation of wheel 32 and in turn shaft 21 and control element 17 in either direction dependent upon whether rack gear 33 is moved upwardly or downwardly. Gear wheel 32 and rack gear 33 illustrate one manner in which the desired rotation of shaft 21 is accomplished.

FIG. 3 illustrates one form of control element of FIGS. 1 and 2 as an integral part 17' of heat insulation 17a such as a silica-phenolic, around shaft 21. Thus insulation 17a is applied to steel shaft 21 along the entire length thereof and includes control member 17' integral therewith, albeit in this embodiment member 17 of FIGS. 1 and 2 as member 17', has lost its identity as a frusto-cone. However, although element 17' is shown as an integral part of insulation material 17a, it is nevertheless the same in principal as element 17 of FIG. 1, as illustrated with reference to the dotted lines 17''.

In the embodiment of FIG. 3 that part of control element 17' adjacent heat insulation 17a and forming substantially the entire spherical end 19 is formed from a silver-infiltrated tungsten sleeve 34, flange locked into position by asbestos phenolic type liner 36 concentric therewith and in turn secured to shaft 21 by screw bolts 37 extending from chamber area 38, the latter closed by threadably engaged asbestos phenolic plug 39.

Heat insulation member 17a includes shoulder surfaces 17b and 17c providing for a seal with the liners 54a and 54b, see FIG. 6. External bearing lock element 41 serves to further secure shaft 21 with casing 11, and bearing 42 supports shaft 21 in the requisite rotation with wheel gear 32, see also FIG. 6.

Referring to FIGS. 4, 5 and 6, nozzle assembly 10 includes nozzle casing 11 containing gas inlet section 13 outwardly flanged at the inlet 13', linear hydraulic actuator 49d, servovalve elements 44, 46 and 47, linear variable differential transformer assembly 60, and gear wheel 32 engaged with rack gear 33. Servovalve unit 44 is secured in operative relationship with linear hydraulic actuator 49d, external hydraulic fluid source 50 and servovalve control mechanism 47 for regulation of travel of rack gear 33.

FIG. 5 illustrates in more detail the linear actuator servovalve assembly mounted on the outside of nozzle casing 11 on support members 48 secured to the exterior nozzle casing wall. Linear variable differential transformer (LVDT) assembly 60 comprises LVDT case 61, LVDT core 62 longitudinally extending within and from case 61 and into direct coaxial connecting contact with longitudinally moving piston 49 of assembly 49d. LVDT windings 63 are disposed in casing 61 around core 62 in operative relationship with core 62 to receive electrical energy via conduit means 64, to detect the position of core 62 in casing 61 and communicate that position with missile control means (not shown) as an index of the position of piston 49 in hydraulic actuator 49d. The position of piston 49 in hydraulic actuator 49d is in turn a measure of the degree of rotation of gear wheel 32 and hence the degree of rotation of rotatable element 17 about shaft 21 in turn indicating the position of element 17 relative to annulus formation. Thus, dependent upon the function of LVDT assembly 60 to indicate, or sense, the position of piston 49, electrical power is supplied by missile control means (not shown) through conduit 46 for actuating the servovalve 44 assembly to move piston 49, and hence element 17, into and from its requisite annulus forming position.

In the operation of the linear hydraulic actuator assembly, as more specifically illustrated with reference to FIG. 5 and FIG. 6, fluid is charged through conduit 50 from external supply into servovalve 44 for delivery into piston chamber 49a to move piston 49 therein as required. Thus in the embodiment shown, servovalve 44 is directed by electrical control means 47 supplied through conduit system 46 to move hydraulic fluid from supply conduit 50 into piston chamber 49a through conduit 51 on to the rearward side of seal 49b, the latter securing piston 49 in fluid type relationship with the piston chamber wall, and thereby to move piston 49 in a direction toward fluid outlet 52 with discharge of any fluid ahead of seal 49b via line 52 to assembly 44 and then to dump or recycle via line 50a. In this manner, piston 49 is extended through the opposite end 49c of chamber 49a into engagement with connector 53 secured to bar rack 33, the latter disposed parallel to the direction of travel of piston 49. Whether servovalve 44 admits fluid into chamber 49c through line 51 or 52, the piston 49 is moved to extend or retract respectively to in turn codirectionally move rack gear 33. In turn, travel of rack gear 33 in engagement with wheel gear 32 provides rotation of gear wheel 32 and hence shaft 21 and control element 17', the latter into its predetermined position with end section 19, in, or out of, operating position as the case may be.

A now preferred embodiment of nozzle assembly 10, as shown in FIG. 6, comprises nozzle casing 11 and liner ring 54 including two sections, 54a and 54b, of which section 54a is concentrically disposed with casing 11 to form the inlet end 13, and section 54b is concentrically disposed to form the outlet end containing divergent section 16 together with liner members 55 and 57 concentric with liner 54b forming the convergent section 12, throat section 14 and an initial gas outlet portion of divergent section 16. Liner section 54a is advantageously formed from an asbestos-phenolic material highly resistant to erosion from incoming combustion gases from the propellant motor section, and section 54b is advantageously formed from a silica-phenolic composite for purpose of improved resistance to erosion from gases. Rotatable element 17' of FIG. 3 is supported on shaft 21 in the nozzle casing wall and extends at its end 23 into operative connection with the linear hydraulic actuator servovalve and gear assembly described hereinabove. Liners 57 and 55 are fabricated respectively from silver-infiltrated tungsten and graphite-phenolic composites, to withstand the erosive and heating effects of the hot gases entering the convergent-divergent nozzle system from the propellant motor. Flange member 58 on nozzle casing 11 and associated external structure 59 serve to facilitate the connection of the nozzle assembly 10 with a rocket motor to provide a rocket assembly of the invention such as of FIG. 2.

By way of further illustration of the invention, in a series of static firing tests utilizing the nozzle assembly of FIG. 6, the nozzle assembly initially containing the larger annulus, such as annulus 24 of FIG. 1, was actuated after 10 seconds of burning time to form the smaller throat area, i.e., the annulus 29 of FIG. 2 at which time, due to the smaller throat area imposed, the pressure increase in the motor was from 315 to 960 psi and the rocket thrust level was correspondingly increased from 1420 to 2190 pounds. By rotation of the control element another 180° the corresponding decrease in pressure, and thrust, is obtained. The rotation cycle can be repeated as required for the performance variation desired.

It is a particular advantage of the variable area rocket nozzle assembly of the invention that the rotatable control element can be actuated from one throat area to the other to accomplish variation in throat area as often as desired. In contrast, in prior art practice utilizing pintels and other area variation means, the actuation is generally restricted to a single actuation from the large throat area to the small throat area.

Although the invention has been particularly described with reference to variation of the rocket motor nozzle area by rotation of the shaft support 180°, the direction of the rocket thrust can be varied by say from 0° to 2.5° at the throat position to augment a regular thrust vector control system during the high thrust operation. Slight rotary movement of the control element within the convergent section of the nozzle assembly to vary the width of the annular throat area from side to side produces thrust deflection in a plane perpendicular to the rotation axis of the control element; and hence the nozzle assembly of the invention is adapted to variation of throat area for controlling both direction and thrust.

As will be evident to those skilled in the art, various modifications can be made or followed in light of the foregoing disclosure and discussion without departing from the spirit or scope of the disclosure or from the scope of the claims.

What I claim and desire to protect by Letters Patent is:

1. A convergent-divergent rocket motor nozzle assembly including coaxially disposed convergent, divergent and intermediate throat sections, comprising an imperforate thrust control element facing said throat upstream therefrom and rotatable on a transverse axis upstream from said throat section and substantially normal to the throat axis;

an end section of said control member dimensioned for emplacement within said convergent section to form an annulus with the inner wall of said convergent section having a minimum cross-sectional area less than the minimum cross-sectional area of said throat;

said transverse axis spaced from said throat and from the end of said end section for rotation of said control element 180° thereon to rotatably move said end section downstream and upstream from said axis respectively into and from position in said convergent section to form or eliminate said annulus;

and means for rotating said element 180° on said transverse axis to move said element end section into and from said position for forming said annulus, whereby said element can be rotated about said transverse axis to provide a variable throat area for control of thrust of a propellant motor when disposed in propulsion relationship with said nozzle assembly.

2. In a nozzle assembly of claim 1, said throat having a cylindrical cross-section, said control element having a spherical end surface constituting said end section for rotation to form said annulus.

3. In a nozzle assembly of claim 2, a shaft forming said transverse axis and rotatably supported at each end in the casing wall of said nozzle assembly and rigidly secured to said rotatable element, and said shaft extending at one end through said casing wall; and means externally adjacent said casing wall in operative relationship with said shaft to rotate same to rotatably move said element end section into and from position for forming said annulus.

4. In a nozzle assembly of claim 3, said control element comprising a frusto-cone having a spherical surface at each end, and said shaft supporting said control element intermediate said end surfaces; one of said spherical surfaces constituting said end section for rotation into said convergent section to form said annulus, and the other of said spherical end surfaces rotatably movable by rotation of said control element on said axis into said convergent section but dimensioned to form a resulting annulus with the inner wall of said convergent section having a minimum cross-sectional area greater than the minimum cross-sectional area of said throat.

5. In an assembly of claim 4 that portion of said control element intermediate its spherical ends constituting an integral part of a layer of heat insulation material secured to said shaft along the length thereof.

6. In a nozzle assembly of claim 5, means including a linear hydraulic actuator controlled by a servovalve assembly as said external means in said operative relationship with said shaft.

7. In a solid rocket propellant assembly, a variable area nozzle assembly of claim 1 as a convergent-divergent nozzle assembly component.

* * * * *